United States Patent
Atsumi et al.

(10) Patent No.: US 9,910,147 B2
(45) Date of Patent: Mar. 6, 2018

(54) RADAR ANTENNA

(71) Applicant: Furuno Electric Co., Ltd., Nishinomiya (JP)

(72) Inventors: Koji Atsumi, Nishinomiya (JP); Dai Takemoto, Nishinomiya (JP); Tetsuya Miyagawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 454 days.

(21) Appl. No.: 14/613,362

(22) Filed: Feb. 4, 2015

(65) Prior Publication Data
US 2015/0219759 A1 Aug. 6, 2015

(30) Foreign Application Priority Data

Feb. 4, 2014 (JP) .................................. 2014-019128

(51) Int. Cl.
*G01S 13/86* (2006.01)
*G01S 7/00* (2006.01)
(Continued)

(52) U.S. Cl.
CPC .............. *G01S 13/86* (2013.01); *G01S 7/003* (2013.01); *G01S 7/03* (2013.01); *G01S 13/9307* (2013.01);
(Continued)

(58) Field of Classification Search
CPC ...... G01S 13/86; G01S 7/03; G01S 2007/027; G01S 13/9307; H01Q 1/34; H01Q 1/42
See application file for complete search history.

(56) References Cited

U.S. PATENT DOCUMENTS 4,818,099 A * 4/1989 Preikschat ............ G01S 7/4812
257/433
4,890,112 A * 12/1989 Petito ...................... G01S 7/003
342/176
(Continued)

FOREIGN PATENT DOCUMENTS

EP 1398847 A1 3/2004
GB 2419056 A 4/2006
(Continued)

OTHER PUBLICATIONS

European Patent Office, Extended European Search Report Issued in Application No. 15153211.6, dated Jun. 5, 2015, Germany, 6 pages.

*Primary Examiner* — Peter M Bythrow
(74) *Attorney, Agent, or Firm* — Alleman Hall Creasman & Tuttle LLP

(57) ABSTRACT

A radar antenna is provided. The radar antenna includes a radar case having a front side and a rear side, a signal processor provided inside the radar case and configured to perform signal processing on a reception signal that is received by an EM radiator configured to transceive an electromagnetic wave, and a wireless LAN antenna fixed inside the radar case, having a horizontal directivity, and configured to transmit the reception signal processed by the signal processor to an external terminal device, the wireless LAN antenna being oriented such that a direction of the horizontal directivity of the wireless LAN antenna is in parallel to the front-and-rear directions of the radar case.

12 Claims, 6 Drawing Sheets

(51) Int. Cl.

| | | |
|---|---|---|
| *G01S 7/03* | (2006.01) | |
| *G01S 13/93* | (2006.01) | |
| *H01Q 1/12* | (2006.01) | |
| *H01Q 1/34* | (2006.01) | |
| *H01Q 1/42* | (2006.01) | |
| *H04W 84/12* | (2009.01) | |

(52) U.S. Cl.
  CPC ............... *H01Q 1/125* (2013.01); *H01Q 1/34* (2013.01); *H01Q 1/42* (2013.01); *H04W 84/12* (2013.01)

(56) References Cited

U.S. PATENT DOCUMENTS

| | | | | |
|---|---|---|---|---|
| 5,274,378 A * | 12/1993 | O'Conner | ............... | G01S 7/003 342/23 |
| 5,432,515 A * | 7/1995 | O'Conner | ............... | G01S 7/003 340/984 |
| 6,249,241 B1 * | 6/2001 | Jordan | ............... | G01S 7/003 342/41 |
| 6,249,242 B1 * | 6/2001 | Sekine | ............... | G01S 7/032 342/175 |
| 6,946,996 B2 * | 9/2005 | Koyama | ............... | H01Q 1/243 343/700 MS |
| 7,170,440 B1 * | 1/2007 | Beckner | ............... | G01S 7/024 342/118 |
| 7,301,494 B2 * | 11/2007 | Waters | ............... | G01S 7/022 342/20 |
| 7,391,362 B2 * | 6/2008 | Beckner | ............... | G01S 7/024 342/118 |
| 7,504,983 B2 * | 3/2009 | Chen | ............... | B62J 11/00 342/20 |
| 7,899,450 B2 * | 3/2011 | Pitt | ............... | G01S 7/003 455/422.1 |
| 8,223,065 B1 * | 7/2012 | Friesel | ............... | G01S 7/003 342/205 |
| 8,428,696 B2 * | 4/2013 | Foo | ............... | A61B 5/0205 600/509 |
| 8,836,570 B2 * | 9/2014 | Ponsford | ............... | G08G 3/02 340/984 |
| 9,219,991 B2 * | 12/2015 | Berry | ............... | H04B 1/3888 |
| 9,389,312 B2 * | 7/2016 | Khlifi | ............... | G01S 7/006 |
| 9,543,635 B2 * | 1/2017 | Schulz | ............... | H01Q 19/12 |
| 2002/0003488 A1 * | 1/2002 | Levin | ............... | G01S 7/023 342/70 |
| 2002/0135504 A1 * | 9/2002 | Singer | ............... | G01S 5/0009 342/20 |
| 2003/0095062 A1 | 5/2003 | Suzuki et al. | | |
| 2006/0129288 A1 * | 6/2006 | Yanagi | ............... | G01S 7/22 701/21 |
| 2009/0058711 A1 * | 3/2009 | Dixon | ............... | G01S 13/886 342/28 |
| 2009/0271054 A1 | 10/2009 | Dokken | | |
| 2010/0194640 A1 * | 8/2010 | Navarro | ............... | G01S 7/006 342/372 |
| 2010/0214085 A1 * | 8/2010 | Avery | ............... | G08G 1/161 340/435 |
| 2012/0032833 A1 * | 2/2012 | Milligan | ............... | G01S 7/006 342/59 |
| 2013/0169468 A1 * | 7/2013 | Johnson | ............... | G01S 13/02 342/41 |
| 2015/0177373 A1 * | 6/2015 | Boeck | ............... | G01S 7/02 342/52 |

FOREIGN PATENT DOCUMENTS

| | | |
|---|---|---|
| JP | 4125483 A | 4/1992 |
| JP | H09018227 A | 1/1997 |
| JP | 2003060543 A | 2/2003 |
| JP | 200384059 A | 3/2003 |
| JP | 2003152585 A | 5/2003 |
| JP | 2008153773 A | 7/2008 |
| JP | 2010503908 A | 2/2010 |
| JP | 2013175808 A | 9/2013 |
| WO | 2008031880 A2 | 3/2008 |

* cited by examiner

RADAR ANTENNA

CROSS-REFERENCE TO RELATED APPLICATION(S)

This application claims priority under 35 U.S.C. § 119 to Japanese Patent Application No. 2014-019128, which was filed on Feb. 4, 2014, the entire disclosure of which is hereby incorporated by reference.

TECHNICAL FIELD

This disclosure generally relates to a radar antenna.

BACKGROUND OF THE INVENTION

Conventionally, radar apparatuses including an aerial unit and an indicator unit are known. JPH04-125483A and JP2003-084059A disclose such radar apparatuses. The aerial unit includes an antenna part (EM radiator) which transmits radio waves while rotating. The aerial unit and the indicator unit are connected to each other by an electric wire. The antenna unit receives the radio waves and outputs them to the indicator unit via the electric wire.

The indicator unit includes a processor and a display unit. The processor performs predetermined signal processing on the received radio waves to create a radar image. The display unit displays the radar image created by the processor.

Note that, in general configurations, a radar antenna and a GPS antenna are separately installed in a ship, whereas in the arts for the radar apparatuses in JPH04-125483A and JP2003-084059A, the GPS antenna is attached to the aerial unit of the radar apparatus. Thus, a compact configuration can be realized.

However, in JPH04-125483A and JP2003-084059A, since the aerial unit and the indicator unit are connected by being wired to each other, in a case of providing a portable display unit, the portable range is limited, which complicates the handling of the display unit. Moreover, in a case of displaying the radar image on a plurality of display units, wiring work becomes complicated.

These kinds of disadvantage are not limited for the ship radar apparatuses, but radar apparatuses installed in other kinds of movable bodies and radar apparatuses disposed on buildings also have similar disadvantage.

Note that, in JPH041992-125483A and JP2003-084059A, the arts of disposing the GPS antenna inside the aerial unit are disclosed, which are simply providing in the aerial unit a GSP antenna which is conventionally disposed above a hull of the ship. Therefore, JPH04-125483A and JP2003-084059A do not disclose nor mention anything regarding disposing in the aerial unit a different type of antenna that is conventionally not disposed above the hull.

SUMMARY OF THE INVENTION

The purpose of this disclosure relates to providing a radar antenna, which displays a detection result of a radar apparatus without a wired connection, and is excellent in the ease of installation.

According to one aspect of this disclosure, a radar antenna having the following configuration is provided. Specifically, the radar antenna includes a radar case having a front side and a rear side, a signal processor provided inside the radar case and configured to perform signal processing on a reception signal that is received by an EM radiator configured to transceive an electromagnetic wave, and a wireless LAN antenna fixed inside the radar case, having a horizontal directivity, and configured to transmit the reception signal processed by the signal processor to an external terminal device, the wireless LAN antenna being oriented such that a direction of the horizontal directivity of the wireless LAN antenna is in parallel to the front-and-rear directions of the radar case.

Thus, the radar antenna wirelessly transmits a detection result obtained therein. Therefore, the detection result can be displayed on a display unit around the radar antenna without a wiring connection. Particularly, since radar antennas are normally disposed at a high position, a wireless LAN radio wave is difficult to be interrupted by an obstacle or the like, and therefore, the radio wave can efficiently be transmitted. Moreover, since the wireless LAN antenna is fixed to the radar case, the wireless LAN antenna can be positioned by simply attaching the radar case to a movable body or the like. Additionally, since the front-and-rear directions are in parallel to the direction of the horizontal directivity of the wireless LAN antenna, a sufficient wireless LAN communicable range required, for example, in a case where the radar antenna is attached to an object long in its front-and-rear directions (e.g., a ship or an aircraft) can be realized.

With the radar antenna, the wireless LAN antenna is preferably either one of a monopole antenna and a dipole antenna, and the wireless LAN antenna is preferably fixed inside the radar case such that an extending direction of a pole-shaped antenna element constituting the either one of the monopole antenna and the dipole antenna intersects with the front-and-rear directions of the radar case at the right angle.

Monopole antennas and dipole antennas generally have comparatively wide directivities compared to horn antennas or microstrip antennas. Therefore, the data acquired by the radar antenna can be transmitted from the wireless LAN antenna even to a portable information terminal device, etc.

With radar antenna, the wireless LAN antenna is preferably fixed to a bottom face of the radar case.

Since radar antennas are normally installed at a high position, by fixing the wireless LAN antenna to the bottom face of the radar case as above, the wireless LAN radio wave can be prevented from being interrupted by the other members of the radar antenna. Therefore, a communication of the wireless LAN antenna with the external terminal device located lower than the radar antenna can be stabilized.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1A:
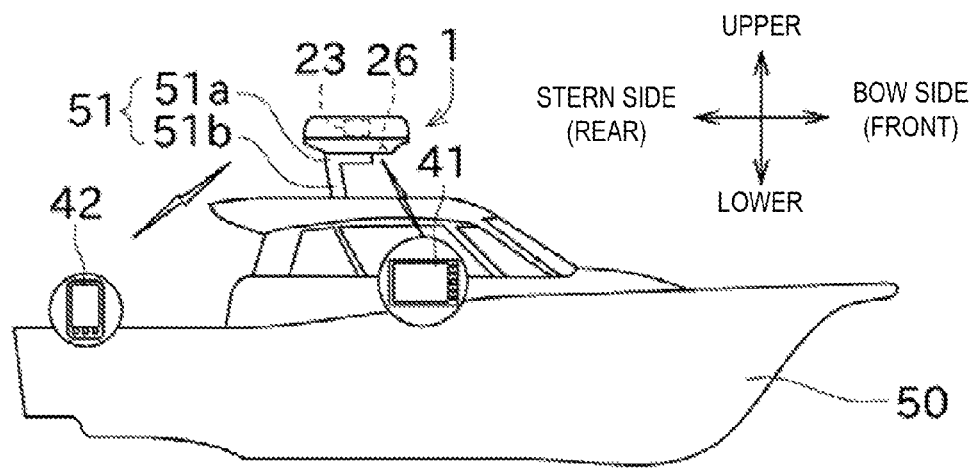
FIGS. 1A and 1B are a side view and a plan view illustrating a state where a radar antenna is attached to a ship according to one embodiment of this disclosure.
Figure 1B:
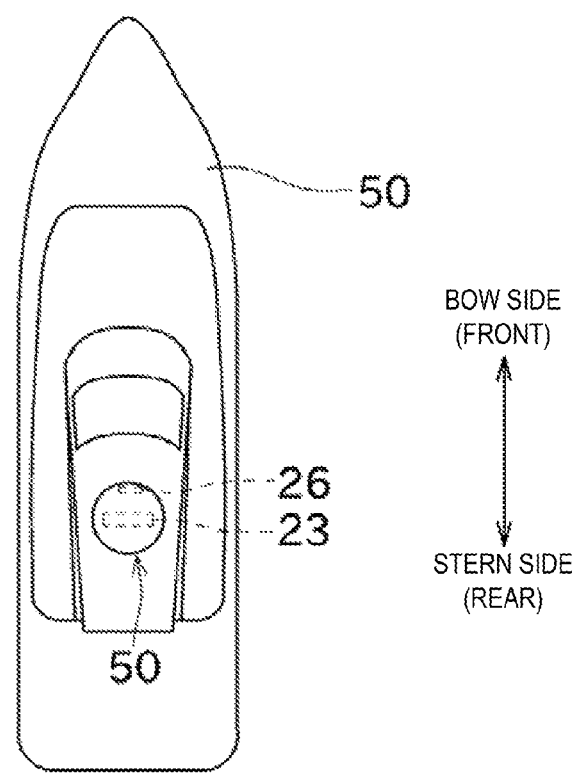

Next, one embodiment of this disclosure is described with reference to the appended drawings. First, a radar antenna 1 of this embodiment is schematically described with reference to FIGS. 1A and 1B. The radar antenna 1 is installed in a movable body, and in this embodiment, the movable body is a ship 50. Specifically, a pedestal 51 is provided, for example, either one of above a cabin and on a mast of the ship 50, etc. The pedestal 51 includes a mount part 51a and a supporting column 51b. The radar antenna 1 is attached to the mount part 51a. The supporting column 51b extends in a lower direction of the ship from a rear position of the mount part 51a and supports the mount part 51a.

The radar antenna 1 transmits transmission signals (radio waves) outside and receives, as reception signals, reflection waves caused by the transmission signals reflecting on target object(s), etc. The radar antenna 1 analyzes each reception signal and detects position(s) of the target object(s) existing in the surrounding of the ship 50 (specific processing is described later). The radar antenna 1 transmits the detected position of each target object existing in the surrounding of the ship 50 to the surroundings by using a wireless LAN radio wave.

An operator on the ship 50 receives the wireless LAN radio wave by using a portable display unit (external terminal device) 41, a smartphone (external terminal device) 42, etc. Either one of the display unit 41 and the smartphone 42 displays, on a display screen thereof, the detection result of the radar antenna 1 by using a drawing, a chart, a graphic, a table, etc.

Hereinafter, the radar antenna 1 is described in detail with reference to FIGS. 2 to 4B. The radar antenna 1 of this embodiment includes a radome (radar case) 10. The radome 10 is made of resin and includes a lower case 11 and an upper case 12.

The lower case 11 has a container shape and multiple components are provided inside the lower case 11 by being attached thereto. The lower case 11 is formed with an attachment hole (attachment portion) 13, a cable introduction hole 14, and a positioning mark 15.

The attachment hole 13 is formed at four positions of a bottom face of the lower case 11 from outside. By using attachments (e.g., bolts) to these holes, the radome 10 (radar antenna 1) is attached to the mount part 51a of the pedestal 51.

The cable introduction hole 14 is a through hole formed at a position of the bottom face of the lower case 11, rearward of the lower case 11 from its center. A power cable 27 connected with a power source of the ship passes through the cable introduction hole 14.

Figure 3A:
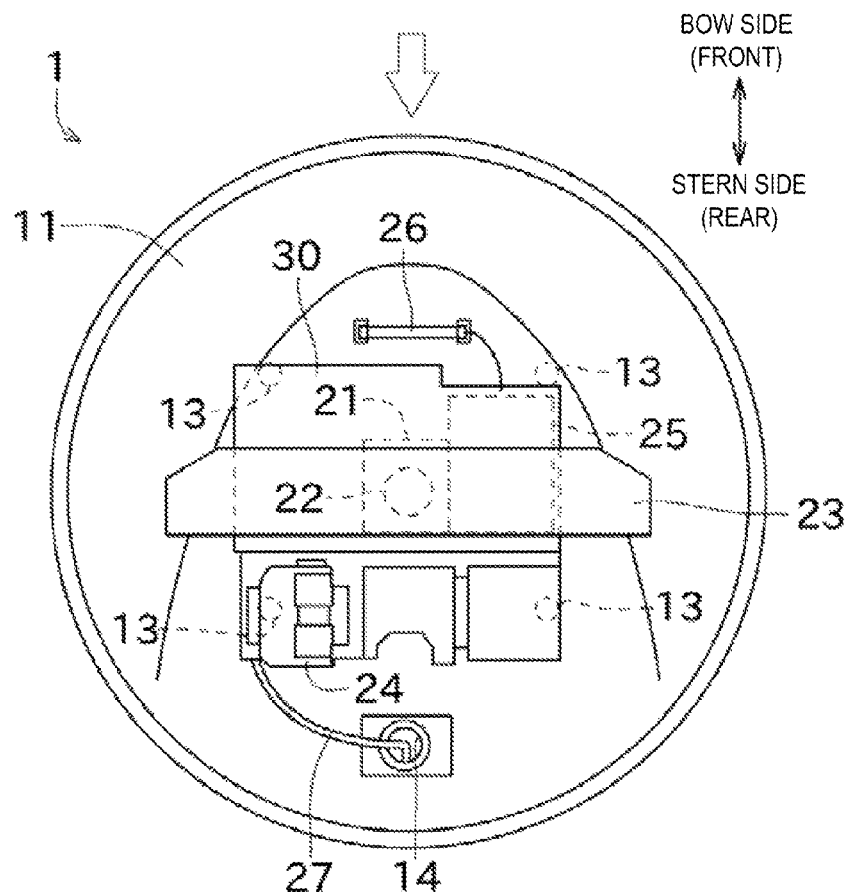
FIGS. 3A and 3B are a plan view and a front view illustrating the radar antenna when an upper case is removed therefrom.
Figure 3B:
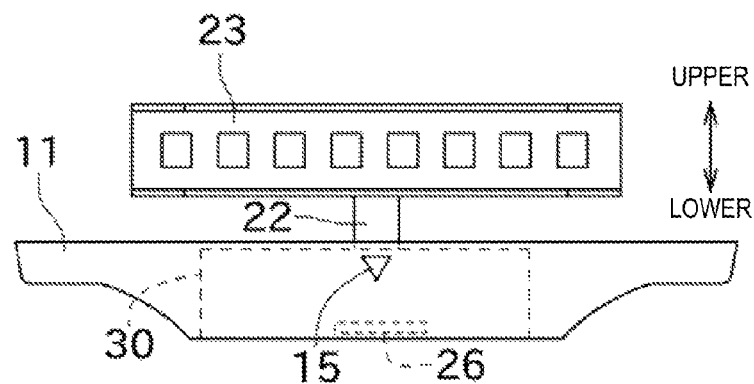

The positioning mark 15 in FIG. 3B indicates front-and-rear directions of the radome 10. Note that, FIG. 3B is a front view of the radar antenna 1 seen in the arrow direction in FIG. 3A. The positioning mark 15 of this embodiment is formed in a front part of the radome 10 (radar antenna 1); however, it may be formed in any one of side parts, the other side part, and a rear part thereof.

The operator grasps an orientation of the radome 10 (radar antenna 1) by referring to the positioning mark 15 and attaches the radome 10 to the pedestal 51 such that the front-and-rear directions of the radome 10 (radar antenna 1) is in parallel to the front-and-rear directions of the ship 50. Note that, in this embodiment, since the plurality of attachment holes 13 are formed, the front-and-rear directions of the radome 10 (radar antenna 1) can accurately be in parallel to the front-and-rear directions of the ship 50. In the case where the radar antenna 1 is attached to the movable body as above, the front side of the movable body corresponds to the front side of the radome 10 (radar antenna 1).

The upper case 12 is connected with the lower case 11 to form an interior space.

Figure 2:
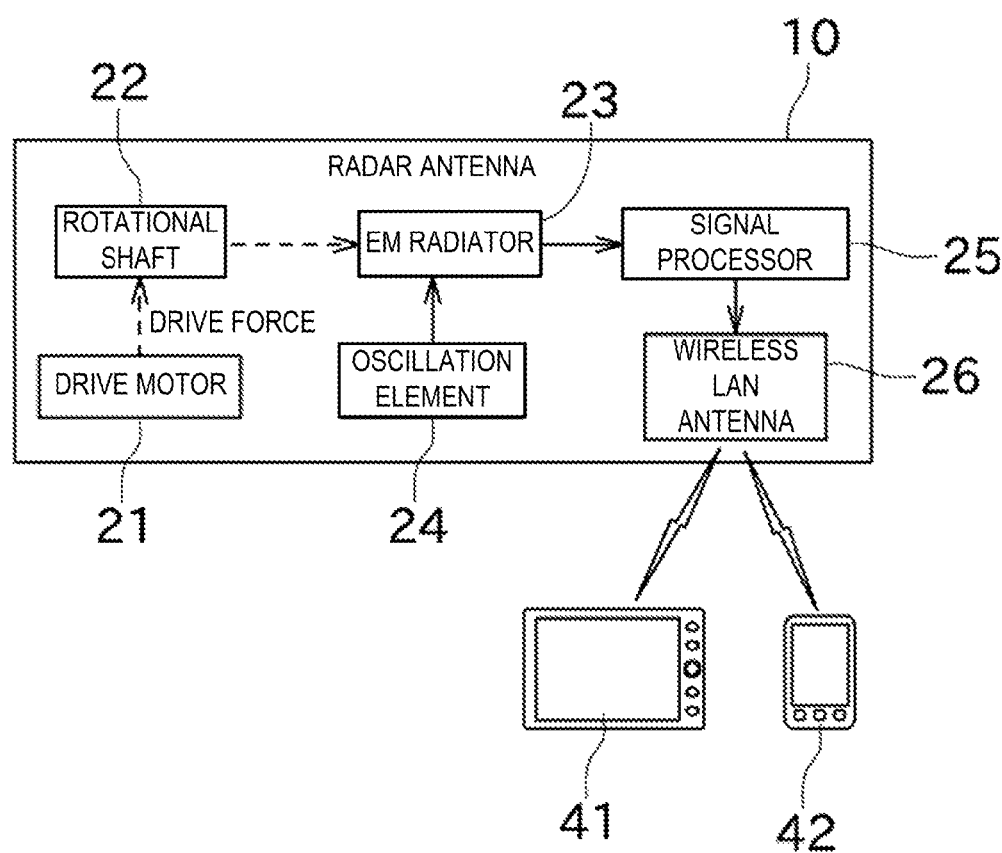
FIG. 2 is a functional block diagram of the radar antenna.

Next, instruments disposed inside the radome 10 are described. As illustrated in FIG. 2 and FIGS. 3A and 3B, inside the radome 10, the radar antenna 1 includes a drive motor 21, a rotational shaft 22, an EM (electromagnetic) radiator 23, an oscillation element 24, a signal processor 25, and a wireless LAN antenna 26.

Moreover, as illustrated in FIGS. 3A and 3B and FIGS. 4A and 4B, a metal case 30 is attached to the lower case 11. The drive motor 21 and the signal processor 25 are disposed inside the metal case 30. Moreover, an electric power is supplied to the instruments disposed inside the radome 10 by the power source cable 27 described above.

The drive motor 21 generates a drive force by using the electric power supplied from the power source cable 27. The drive force of the drive motor 21 is transmitted to the rotational shaft 22.

The rotational shaft 22 rotates by receiving the drive force of the drive motor 21. The EM radiator 23 is fixed on the rotational shaft 22 and, thus, the EM radiator 23 also rotates integrally with the rotational shaft 22.

The EM radiator 23 is a patch antenna formed by a substrate on which a plurality of sheets of copper foils, etc. are adhered, and a plate member arranged perpendicular to the upper-and-lower directions of the substrate. The EM radiator 23 transmits the transmission signal outside and receives, as the reception signal, the reflection wave caused by the transmission signal reflecting on the target object. Since the EM radiator 23 performs the transception while rotating, the target object in the surrounding of the ship can be detected. Note that, the EM radiator 23 is not limited to the patch antenna, and it may be a horn antenna, a parabolic antenna, etc.

The oscillation element 24 receives an instruction from, for example, a controller (not illustrated), and generates each transmission signal to be transmitted from the EM radiator 23. The oscillation element 24 is disposed rearward of (on the stern side than) the metal case 30. In this embodiment, a magnetron radar is adopted, and therefore, the oscillation element 24 is a magnetron. Note that, in a case where a pulse compression radar is adopted, a signal generation circuit corresponds to an oscillation circuit to serve as the oscillation element 24.

The signal processor 25 performs signal processing on each reception signal received by the EM radiator 23. Specifically, the signal processor 25 performs amplification, filtering, data conversion and the like on the reception signal. In the data conversion, based on the reception signals, a position of a representative point is determined for each echo and an intensity of the echo is obtained.

By performing the data conversion as above, an amount of data to be transmitted to the display unit 41, etc. can be suppressed, which leads to suppressing an amount of operation performed by the display unit 41, etc. Note that, the data conversion is not essential, and the signal processor 25 may only perform the filtering so that the radar image is created based on the reception signal on the display unit 41 side. Moreover, the radar image may be created on the radar antenna 1 side and transmitted to the display unit 41, etc.

The wireless LAN antenna 26 of this embodiment is a dipole antenna and has a directivity. The wireless LAN antenna 26 is fixed by being attached to the bottom face of the lower case 11 from the inside. The wireless LAN antenna 26 of this embodiment is arranged such that a wire conducted direction (longitudinal direction) thereof is in parallel to the left-and-right directions of the radome 10 (an extending direction of a pole-shaped antenna element constituting the wireless LAN antenna 26 intersects with the front-and-rear directions of the radome 10 at the right angle). The wireless LAN antenna 26 outputs the data obtained by the signal processor 25, within the ship through the wireless LAN radio wave.

Moreover, the wireless LAN antenna 26 is fixed to a position below the EM radiator 23 and forward of the four attachment holes 13 (i.e., forward of the mount part 51a). Since the wireless LAN antenna 26 is fixed below the EM radiator 23, the wireless LAN antenna 26 can be prevented from receiving an influence of the radio wave transmitted from the EM radiator 23. Furthermore, since the wireless LAN antenna 26 is fixed forward of the attachment holes 13, the wireless LAN radio wave can be prevented from being interrupted by the mount part 51a and supporting column 51b. Additionally, the wireless LAN antenna 26 is disposed forward of (on the bow side than) the metal case 30 with a slight distance therefrom. Thus, an electromagnetic wave formed around the oscillation element 24 can be blocked by the metal case 30, and as a result, the wireless LAN antenna 26 can be prevented from receiving an influence of the electromagnetic wave.

The metal case 30 is a metal box-shaped member and attached to the bottom face of the lower case 11 from the inside. Since the metal case 30 covers the signal processor 25, it can be prevented that the radio waves outputted from the EM radiator 23 and the wireless LAN antenna 26 influence the signal processor 25.

Figure 4A:
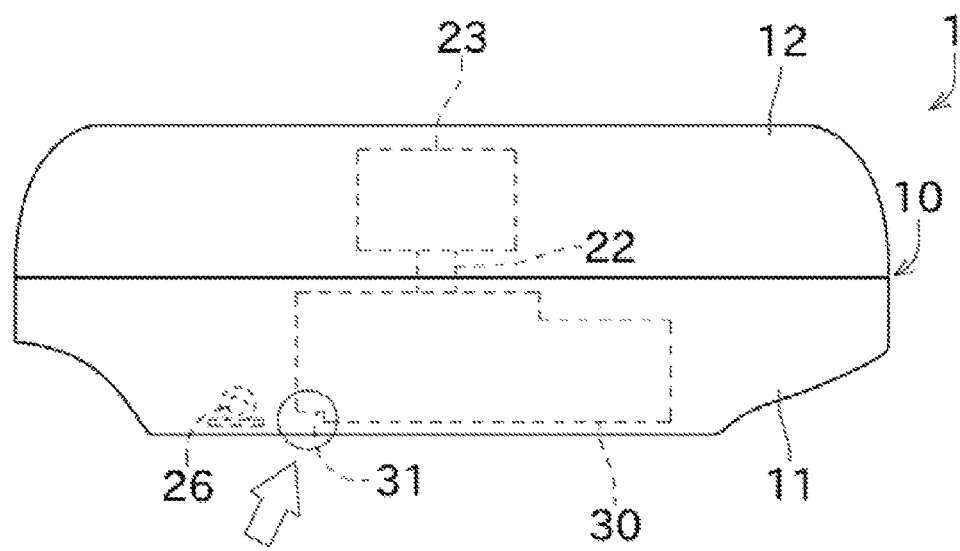
FIGS. 4A and 4B are schematic views illustrating an outline of the radar antenna and concave portions of a metal case, respectively.
Figure 4B:
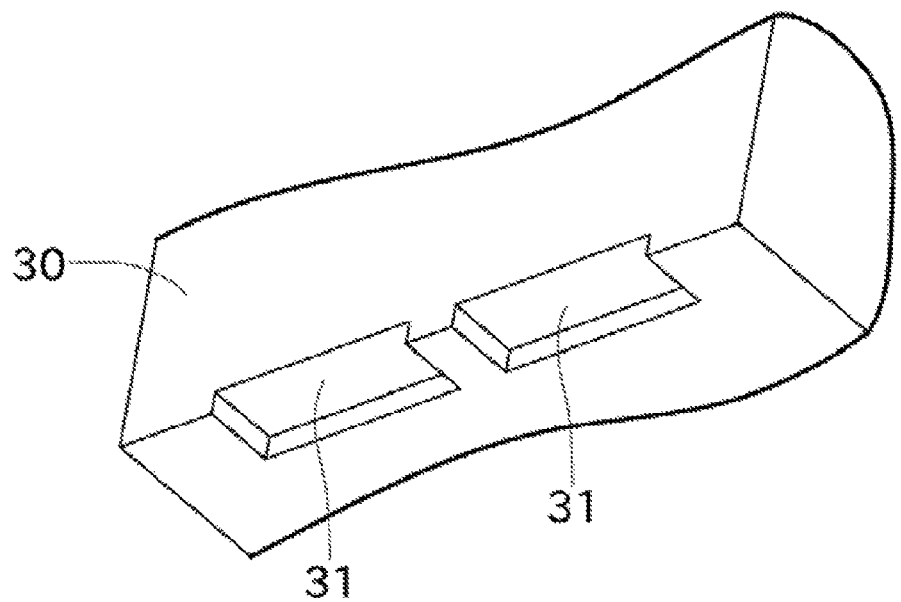

Moreover, as illustrated in FIGS. 4A and 4B, the metal case 30 is formed with concave portions 31. Note that, FIG. 4B is a perspective view of a part of the metal case 30 denoted with a circle in FIG. 4A, seen in the arrow direction. The concave portions 31 are formed in a lower end part of the metal case 30, near the wireless LAN antenna 26. Thus, the radio wave of the wireless LAN antenna 26 becomes difficult to be interrupted by the metal case 30, and as a result, a communicable range of the wireless LAN can be expanded. Note that, as illustrated in FIG. 4B, two concave portions 31 on the left and right with respect to the center of the metal case 30 are formed inside the metal case 30; however, the concave portions 31 may be formed continuously to be a single concave portion 31. Moreover, each concave portion 31 may have any shape as long as the radio wave of the wireless LAN antenna 26 is difficult to be interrupted.

Since the detection result of the radar antenna 1 can be transmitted by using the wireless LAN radio wave with the above configuration, the detection result of the radar antenna can be displayed on the display unit 41, etc. without the wiring connection of the radar antenna 1 with the display unit 41, etc. The effect of this configuration is especially advantageous in either one of a case where the detection result of the radar antenna is displayed on a plurality of the external terminal devices, and a case where the external terminal device is a mobile terminal.

Next, a relationship between a sensitive direction (directivity) of the wireless LAN antenna 26 and orientations of the radar antenna 1 and the ship 50 is described with reference to FIGS. 5A and 5B. Note that, in this embodiment, the word "directivity" indicates that a radio wave intensity is different depending on the direction in which the radio wave is outputted.

As described above, since the wireless LAN antenna 26 is a dipole antenna, it has a directivity. Although the detailed description of the directivity of the dipole antenna is omitted since it is known, the wireless LAN antenna 26 has a directivity of a donut shape centering on the wireless LAN antenna 26. FIG. 5A illustrates the directivity when the ship 50 is seen from the right, and FIG. 5B illustrates the directivity (at the height of wireless LAN antenna 26) when the ship 50 is seen from above.

As described above, the wireless LAN antenna 26 is arranged such that the wire conducted direction intersects with the front-and-rear directions of the radome 10 at the right angle. Further, by attaching the radome 10 by using the attachment holes 13, the front-and-rear directions of the radome 10 can be in parallel to the front-and-rear directions of the ship 50. Therefore, by simply attaching the radome 10 to the pedestal 51, the orientation of the wireless LAN antenna 26 can suitably be adjusted in consideration with the sensitive direction. Therefore, the positional adjustment of the wireless LAN antenna 26 is not required, which makes the attaching work easy.

Moreover, since the orientation of the wireless LAN antenna 26 is determined as above, the following effects can be exerted. Specifically, the sensitive direction of the wireless LAN antenna 26 includes the front-and-rear directions and the upper-and-lower directions. Furthermore, since the shape of the ship 50 is long in the front-and-rear directions, for the purpose that the communicable range of the wireless LAN covers the inside of the ship 50, the sensitive direction of the wireless LAN antenna 26 does not necessarily include the left-and-right directions. Therefore, by disposing the wireless LAN antenna 26, which is a dipole antenna, as this embodiment, a sufficient communicable range of the wireless LAN can be realized. Further, since the sensitivity in the left-and-right directions is weaker, a confused connection with wireless communication instruments installed in other ships around the ship 50 and interference with radar apparatuses of the other ships when the ship 50 is moored at a port can be prevented.

Figure 6:
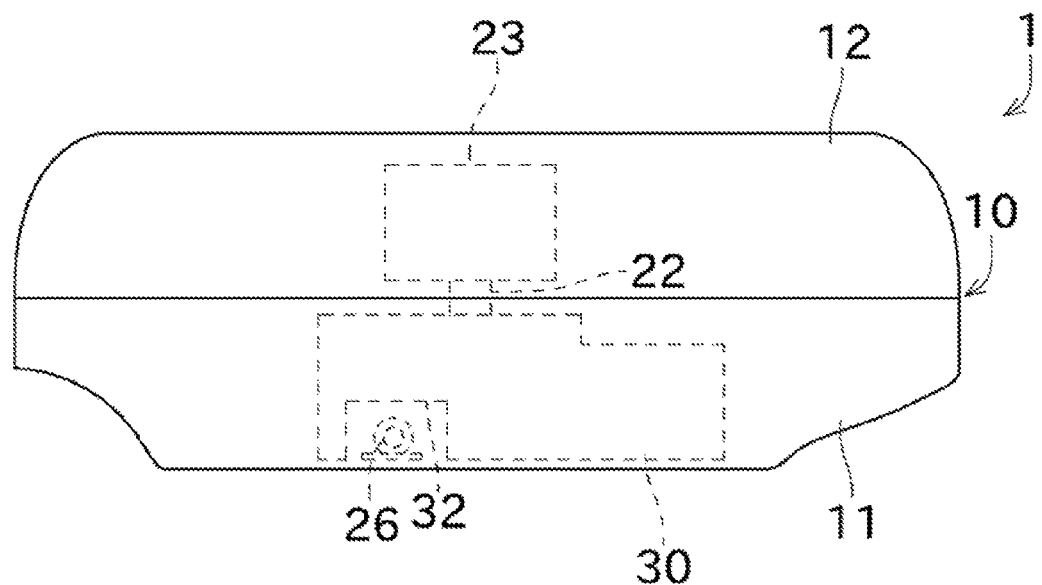
FIG. 6 is a view illustrating an outline of a radar antenna having a reflective part which reflects a radio wave of the wireless LAN antenna according to a first modification of the embodiment.

Next, a first modification of this embodiment is described. FIG. 6 illustrates the first modification in which a reflective part 32 configured to reflect the radio wave of the wireless LAN antenna 26 is provided. The reflective part 32 is a face of a part of a concave portion of the bottom face of the metal case 30, located above the wireless LAN antenna 26. In other words, the wireless LAN antenna 26 is disposed to overlap with the metal case 30 in the upper-and-lower directions of the metal case 30.

Figure 5A:
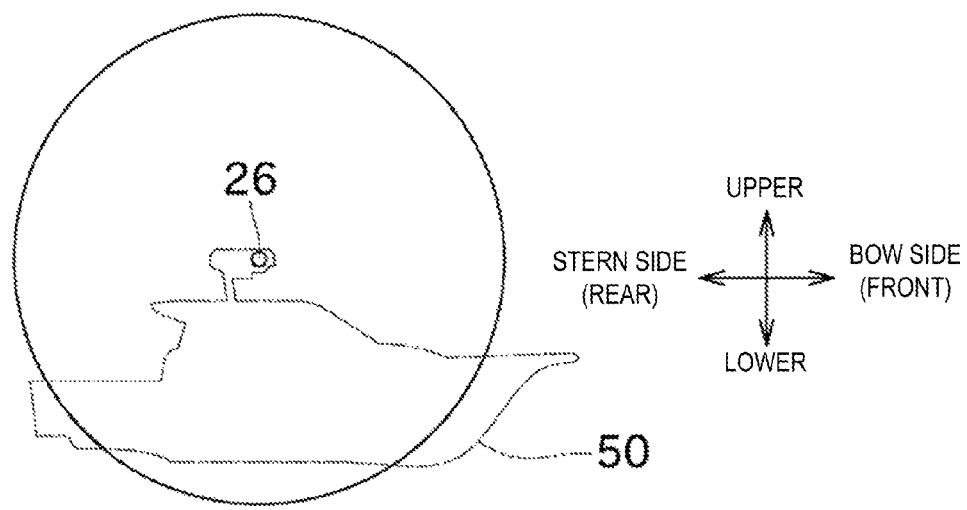
FIGS. 5A and 5B are views illustrating a positional relationship between a directivity of a wireless LAN antenna and the ship.
Figure 5B:
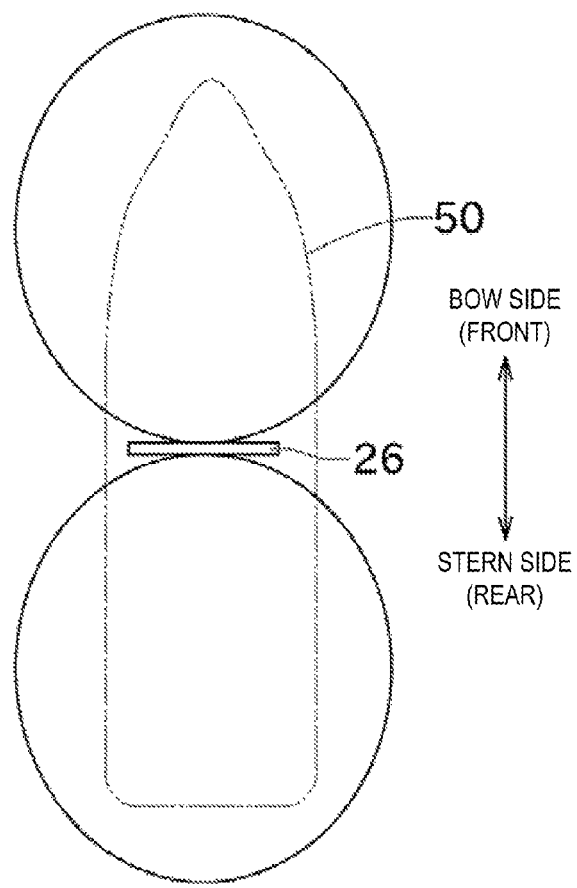

As illustrated in FIG. 5A, the sensitive direction of the wireless LAN antenna 26 includes the upper direction. However, since the communication within the ship 50 is considered sufficient as long as the wireless LAN antenna 26 can communicate in the lower direction, there is no need to transmit the radio wave in the upper direction.

In consideration of this, in the first modification, by providing above the wireless LAN antenna 26 the reflective part 32 which can reflect the radio wave, the quality and intensity of the radio wave to be transmitted downward can be improved. Further in this embodiment, by utilizing the part of the metal case 30 as the reflective part 32, the radar antenna 1 can be reduced in size. Note that, the reflective part may be formed by using a different member from the metal case 30.

Figure 7:
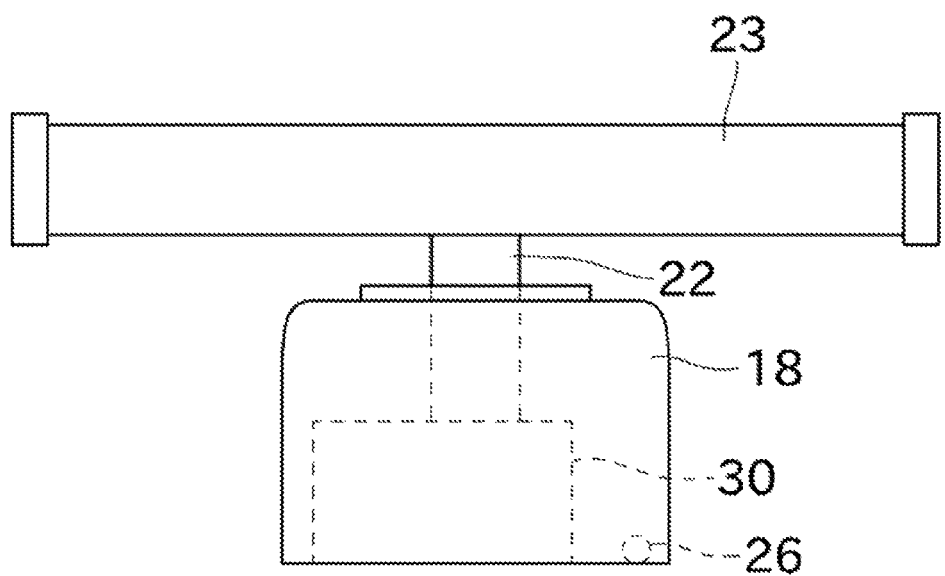
FIG. 7 is a view illustrating a state of an EM radiator in a case where it is provided outside a resin case according to a second modification of the embodiment.

Next, a second modification is described. FIG. 7 illustrates the second modification in which the EM radiator 23 is provided outside a resin case (radar case) 18. In this embodiment, the radome 10 as a case covers all the other instruments described above, whereas in the second modification, the resin case 18 covers the metal case 30 and the wireless LAN antenna 26, but not the EM radiator 23.

However, also in the second modification, "the effect that the wireless LAN antenna 26 can be positioned by simply attaching the resin case 18 to the pedestal 51" can be exerted. In other words, the effects of the present disclosure can be exerted as long as the wireless LAN antenna is disposed at least in the case.

As described above, the radar antenna 1 includes the radome 10 (resin case 18), the signal processor 25, and the wireless LAN antenna 26. The radome 10 and the like have a front side and a rear side. The signal processor 25 performs the signal processing on the reception signal received by the EM radiator 23 configured to transceive the electromagnetic wave, and is provided inside the radome 10. The wireless LAN antenna 26 is fixed inside the radome 10, having the horizontal directivity, transmits the reception signal processed by the signal processor 25 to the display unit 41 and the smartphone 42, and the wireless LAN antenna 26 is oriented such that the sensitive direction among the horizontal directions is in parallel to the front-and-rear directions of the radome 10.

As above, since the radar antenna 1 wirelessly transmits the detection result, the detection result can be displayed on the display unit 41, etc. around the radar antenna 1 without the wiring connection. Particularly, since the radar antenna 1 is disposed above the hull of the ship, the wireless LAN radio wave is difficult to be interrupted by an obstacle or the like, and therefore, the radio wave can efficiently be transmitted. Moreover, since the wireless LAN antenna 26 is fixed to the radome 10, the wireless LAN antenna 26 can be positioned by simply attaching the radar antenna 1 to the pedestal 51 by using the attachment holes 13 of the radome 10. Therefore, the attaching work of the wireless LAN antenna 26 can be easy. Additionally, since the front-and-rear directions are in parallel to the direction of the horizontal directivity of the wireless LAN antenna 26, the sufficient communicable range required in the case where the radar antenna 1 is attached to the ship can be realized.

Although the preferred embodiment of this disclosure and the modifications are described above, the above configurations may be modified as follows.

In the above embodiment, the dipole antenna is used as the wireless LAN antenna; however, any kind of the antenna may be adopted. For example, since a monopole antenna has a similar directivity to the dipole antenna, similar effects to the above embodiment can be exerted. Moreover, in a case where only a limited range within the ship 50 (e.g., only the cabin) is required for communication, an antenna with narrow directivity, such as a patch antenna, may be used.

The present disclosure is not limited to the radar antennas for ships, and may be adopted to a configuration to be installed in other movable bodies (e.g., aircrafts and automobiles). The effect that the sufficient communicable range can be realized can be exerted as long as the other movable bodies are long in their front-and-rear directions. Moreover, the present disclosure may be adopted to radar antennas to be installed in lighthouses and configured to monitor positions of movable bodies. Even with the radar antennas to be installed in lighthouses, by using a wireless LAN antenna having a suitable directivity according to the shape of the lighthouse, the effect that the sufficient communicable range can be realized can be exerted.

In the above embodiment, the EM radiator 23 rotates; however, for example in either one of a case where antenna element(s) are provided over the entire circumference and a case where the detection is performed only in a certain direction (e.g., forward), the rotation of the EM radiator is unnecessary.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A radar antenna, comprising:
    a radar case having a front side and a rear side;
    a signal processor provided inside the radar case and configured to perform signal processing on a reception signal that is received by an EM radiator configured to transceive an electromagnetic wave; and
    a wireless LAN antenna fixed inside the radar case, having a radio wave intensity with a horizontal directivity that is a sensitive direction, and configured to transmit the reception signal processed by the signal processor to an external terminal device, the wireless LAN antenna being oriented such that the sensitive direction of the horizontal directivity of the wireless LAN antenna is in parallel to a longitudinal direction extending through the front side and the rear side of the radar case.

2. The radar antenna of claim 1, wherein the wireless LAN antenna is either one of a monopole antenna and a dipole antenna, and the wireless LAN antenna is fixed inside the radar case such that a wire conductor direction that is an extending direction of a pole-shaped antenna element constituting the either one of the monopole antenna and the dipole antenna intersects with the longitudinal direction of the radar case at a right angle.

3. The radar antenna of claim 1, wherein the radar case has a positioning mark applied to any one of the front and rear sides and left and right sides of the radar case, indicating a side to which the positioning mark is applied.

4. The radar antenna of claim 1, wherein the EM radiator is disposed inside the radar case.

5. The radar antenna of claim 1, wherein a reflective surface is disposed above the wireless LAN antenna.

6. The radar antenna of claim 1, further comprising a metal case disposed inside the radar case,
    wherein the wireless LAN antenna is disposed outside the metal case, and the signal processor is disposed inside the metal case.

7. The radar antenna of claim 6, the metal case further comprising a lower case and an upper case, wherein a concave portion is formed in the lower case of the metal case, and the wireless LAN antenna is disposed near the concave portion.

8. The radar antenna of claim 6, further comprising an oscillation element provided inside the radar case and configured to generate a transmission signal, the oscillation element being disposed on one side of the metal case opposite to the wireless LAN antenna.

9. The radar antenna of claim 1, wherein the wireless LAN antenna is fixed to a bottom of the radar case.

10. The radar antenna of claim 1, wherein the radar case has attachment portions to orient an object to which the radar antenna is to be attached, such that front-and-rear directions of the object is in parallel to the longitudinal direction of the radar case.

11. The radar antenna of claim 10, wherein the wireless LAN antenna is fixed to a bottom of the radar case, on the front side of the radar case relative to the attachment portions.

12. The radar antenna of claim 10, wherein the object to which the radar antenna is to be attached is a movable body.

\* \* \* \* \*